United States Patent [19]

Ferguson

[11] Patent Number: 4,686,615
[45] Date of Patent: Aug. 11, 1987

[54] POWER SUPPLY CIRCUIT

[75] Inventor: Michael J. Ferguson, Edinburgh, Scotland

[73] Assignee: Ferranti, plc, Cheshire, England

[21] Appl. No.: 895,918

[22] Filed: Aug. 13, 1986

[30] Foreign Application Priority Data

Aug. 23, 1985 [GB] United Kingdom ............... 8521183

[51] Int. Cl.$^4$ ........................................... H02M 3/335
[52] U.S. Cl. ...................................... 363/17; 363/98; 323/266
[58] Field of Search ................... 363/17, 41, 98, 124, 363/132; 323/282–288, 266

[56] References Cited

U.S. PATENT DOCUMENTS

| 3,737,755 | 6/1973 | Calkin et al. | 363/17 |
| 3,742,330 | 6/1973 | Hodges et al. | 363/41 |
| 4,099,225 | 7/1978 | Nygaard | 363/98 X |
| 4,533,986 | 8/1985 | Jones | 363/17 |

FOREIGN PATENT DOCUMENTS 0001770  1/1981  Japan .................... 363/17

OTHER PUBLICATIONS

Vickerton, "Multiple-Output Switch-Mode Power Supply Design", New Electron. (GB) vol. 12, No. 12, Jun. 12, 1979, pp. 17–18.

Primary Examiner—Peter S. Wong
Attorney, Agent, or Firm—Kerkam, Stowell, Kondracki & Clarke

[57] ABSTRACT

A direct-current power supply circuit includes a series-connected switch (TR1) and an inducator (L) connected together with a flywheel diode (D) across an input voltage supply ($V_s$). A transformer (TX) has a primary winding connected to the inductor (L) and the diode (D) by way of a bridge-connected network of switching devices (TR2-TR5). A reservoir capacitor (c) is connected to a secondary winding of the transformer (TX) by way of a full-wave rectifier (DB), and a load (LD) may be connected to the reservoir capacitor (c). Control means (CM) are provided to control the operation of the series-connected switch (TR1) and the network of switching devices (TR2-TR5) so that each cycle of operation transfers an equal amount of charge to the reservoir capacitor (c) regardless of variations in the input voltage ($V_s$) or load conditions.

2 Claims, 7 Drawing Figures

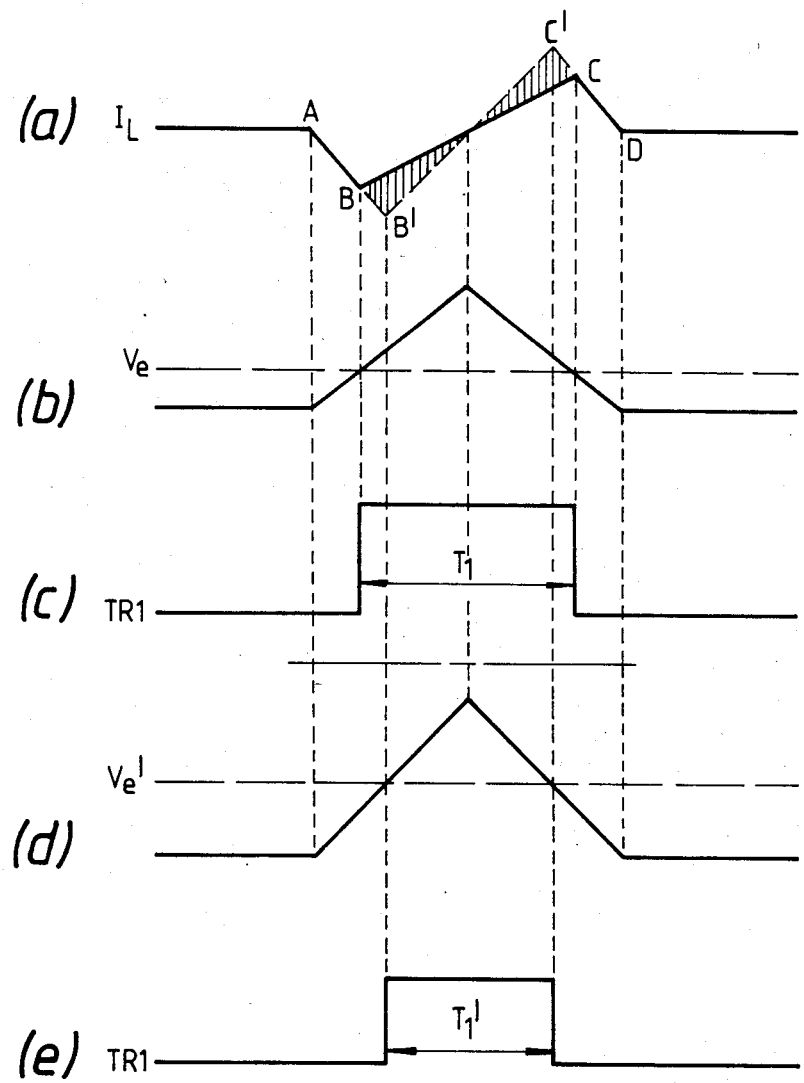

POWER SUPPLY CIRCUIT

This invention relates to power supply circuits and particularly, though not exclusively to circuits for supplying direct current power to pulsed loads.

A common form of power supply is the switched voltage regulator in which the ouput voltage is determined by the on-off ratio of a series-connected switch. Such a power supply usually comprises a voltgae source, a switching transistor and an inductance-capacitance filter supplying the load. A diode is connected across the filter to maintain the flow of current through the inductor when the transistor switch is open.

Many such power supply circuits effect control and regulation by way of various control loops, but these are often complex and not always sufficiently effective.

It is an object of the invention to provide a power supply of the buck/boost regulator type having a simpler and more effective control arrangement.

According to the present invention there is provided a direct-current power supply circuit which includes a series-connected switch and an inductor connected together with a flywheel diode across an input voltage supply, a transformer having a primary winding connected to the inductor and the diode by way of a bridge-connected network of switching devices, a reservoir capacitor connected to a secondary winding of the transformer by way of a full-wave rectifier and arranged for connection to a load, and control means operable to control the operation of the series-connected switch and of the network of switching devices so that a voltage of either one or the opposite polarity or a short-circuit may be applied across the primary winding of the transformer and such that each cycle of operation of the switching devices and of the series-connected switch transfers an equal amount of charge to the reservoir capacitor regardless of variations in the input or output voltage.

The invention will now be described with reference to the accompanying drawings, in which:

FIG. 7 illustrates the operation of the circuit of FIG. 6.

Figure 1:
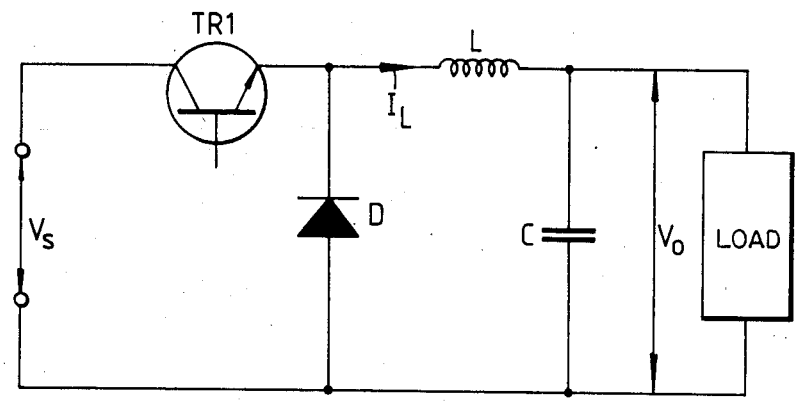
FIG. 1 is a schematic diagram of a known power supply circuit.
Figure 2:
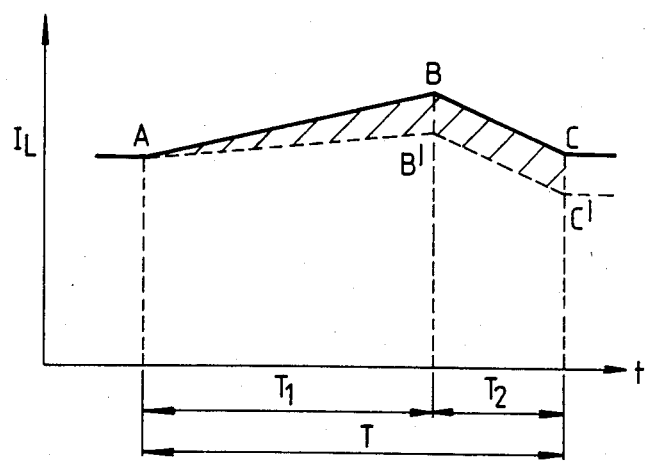
FIG. 2 illustrates the operation of the circuit of FIG. 1.

Referring now to FIG. 1, this shows a schematic circuit diagram of a known series-switched voltage regulator. A transistor switch TR is connected in series with an inductor L and a capacitor C across a voltage supply $V_s$. A flywheel diode D is connected across the series-connected inductor L and capacitor C, whilst the load LD is connected across the capacitor C where the output voltage is denoted by $V_o$. A timing circuit, not shown, controls the operation of the switch TR, and one cycle of its operation is shown in FIG. 2, which is a graph relating the current $I_L$ flowing through the inductor L to the time t. It will be seen that when the switch TR is closed the current build up in a linear manner from A to B on the curve, during a time interval $T_1$. The switch is then opened, and the current in the inductor decays over a time $T_2$ from B to C. The area under the curve ABC represents the quantity of charge transferred to the load during the cycle, and the timing of the operation of the switch TR is arranged so that the average current flowing through the inductor L remains constant.

If the input supply voltage $V_s$ is reduced for any reason then the slope of the first part of the waveform is reduced, as shown at AB' in FIG. 2. However, the slope of the other part of the waveform B'C remains the same as before, and hence there is a change in both the quantity of charge transferred during the cycle and in the average current through the inductor. The quantity of charge transferred is reduced by a proportion represented by the shaded area in FIG. 2.

Figure 3:
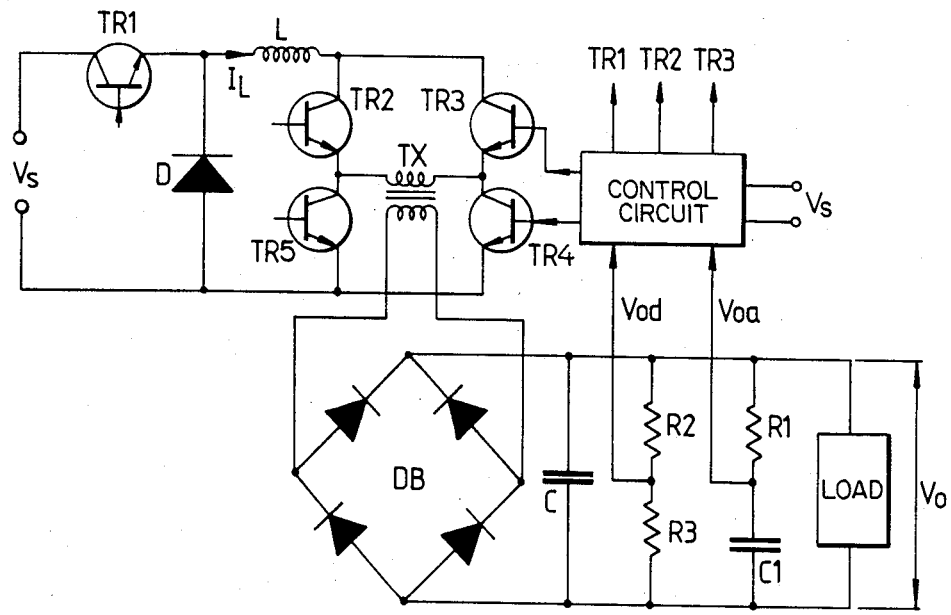
FIG. 3 is a schematic circuit diagram of an embodiment of the invention.

FIG. 3 is a circuit diagram of an embodiment of the invention, from which it will be seen that the capacitor C and load LD of FIG. 1 have been replaced by four switching devices TR2 and TR5 connected in a bridge network. Across one diagonal of the network of switches is connected the primary winding of a transformer TX. The secondary winding of the transformer is connected by way of a full-wave rectifier bridge DB to the reservoir capacitor C and the load LD.

Figure 4:
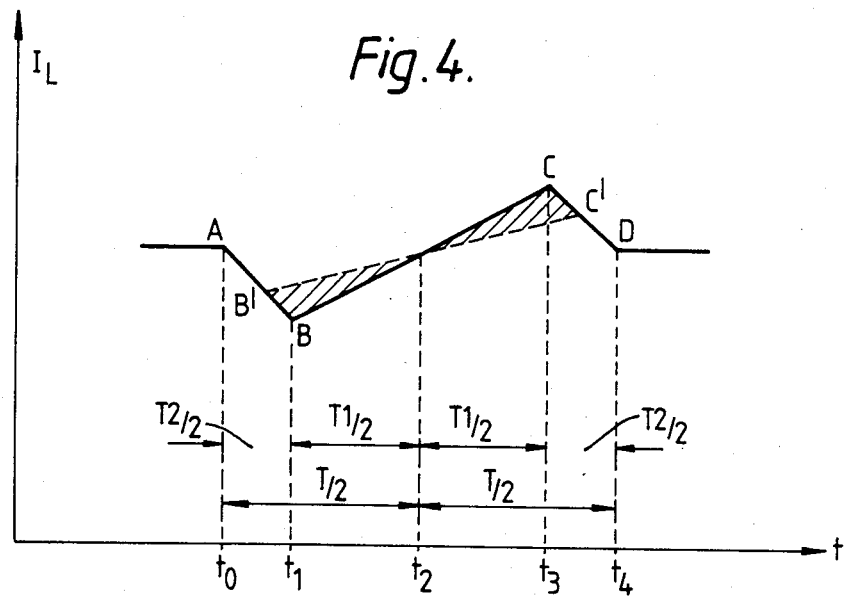
FIG. 4 illustrates the operation of the circuit of FIG. 3.

Operation of the series switch TR1 and the network switches TR2 to TR5 is controlled by a control circuit which will be described in detail later. This circuit is arranged to operate the switches in such a manner as to produce an inductor current waveform as shown in FIG. 4. From this drawing it will be seen that the sequence is arranged to be symmetrical about the midpoint, with the time interval T2 of FIG. 2 now split into two equal parts on either side of the interval $T_1$. As before, $T_1$ is the period during which the series switch TR1 is closed and T2 the period during which it is open. Also as before the quantity of charge transferred during a cycle is represented by the area under the curve ABCD.

A change is the input voltage $V_s$ changes the slope of the portion BC of the curve about its centre point. As a result the area under the curve AB'C'D remains the same as before. The control circuit is therefore arranged to operate the switch TR1 so as to vary the intervals T1 and T2 to produce this result.

Figure 5:
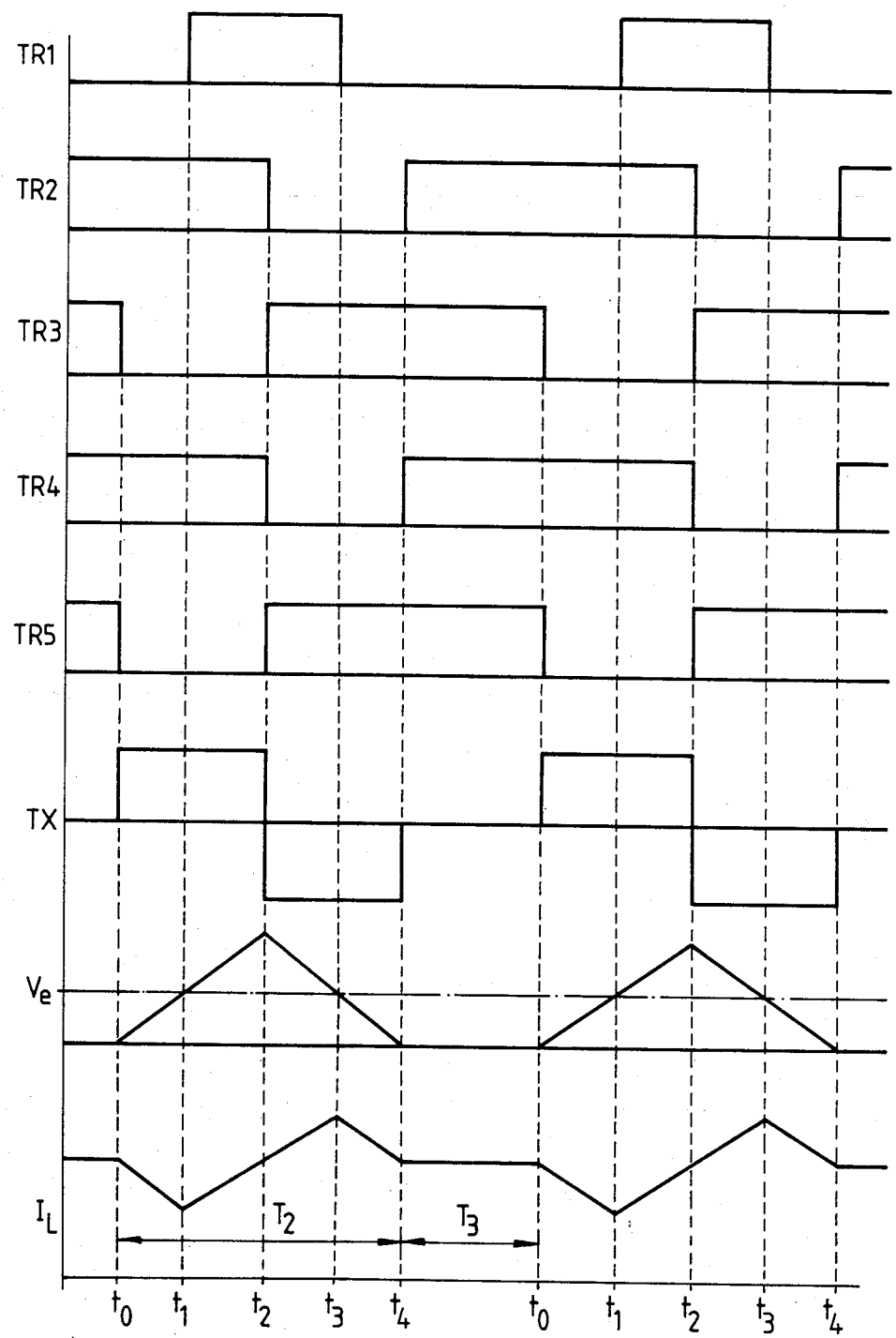
FIG. 5 shows varied waveforms occurring during the operation of the circuit of FIG. 3.

The general sequence of operation of the control circuit will be described with reference to FIG. 5. This shows various control and output waveforms used in the sequence of operations, primarily the control waveform for the switches TR1 to TR5. Basically, the circuit provides a fixed cycle time within which any charge extracted from the reservoir capacitor C of FIG. 3 must be replaced. The cycle includes a period of "dead" time, the duration of which may vary as the load conditions vary. As shown in FIG. 5 the time for which switch TR1 is closed is denoted by T1, whilst the overall cycle time T is made up of "active" time $(T_1+T_2)$ and "dead" time $T_3$. During the "dead" time all four switches TR2 to Tr5 in the network are closed. This prevents any voltage from being developed across the primary winding of the transformer TX. At a time to switches TR3 and TR5 are opened, allowing a current to flow from inductor L through switches TR2 and TR4 and the primary winding of the transformer. At some later time $t_1$, determined by the control circuit as will be described later, switch TR1 is closed, allowing current to flow from the supply through the inductor L and the closed switches TR2 and TR4. At time $t_2$ switches TR2 and TR4 are opened whilst switches TR3 and TR5 are closed. This results in a reversal of current through the primary winding of the transformer. The control circuit opens the switch TR1 at time $t_3$, whilst at a later time $t_4$ switches TR2 and TR4 are closed. This places a short-circuit across the primary winding of the transformer TX, reducing the voltage across the primary winding to zero. Current continues to flow from the inductor L through the flywheel diode D.

FIG. 5 also shows the current flow through the inductor L resulting from the switch operations described above. When all four switches TR2 to TR5 are closed during the "dead" time $T_3$, the current remains substantially constant. When switches TR3 and TR5 are opened, energy stored in the inductor is dissipated in producing a current in the primary winding of the transformer TX, causing the current to drop as energy is dissipated. However, when switch TR1 is closed at time $t_1$, energy is supplied from the source, and the current flowing through the inductor rises as energy is supplied to the reservoir capacitor C. At the end of the time period T1, when switch TR1 is opened, current flowing from the inductor through the transformer again dissipates some of the stored energy of the inductor, causing the current to fall. At time $t_4$ the transformer primary winding is short-circuited, resulting in a steady current flow from the inductor.

The above sequence is repeated continuously so long as the circuit is operating. It will be noted that the inductor current is never allowed to fall to zero under any conditions.

Figure 6:
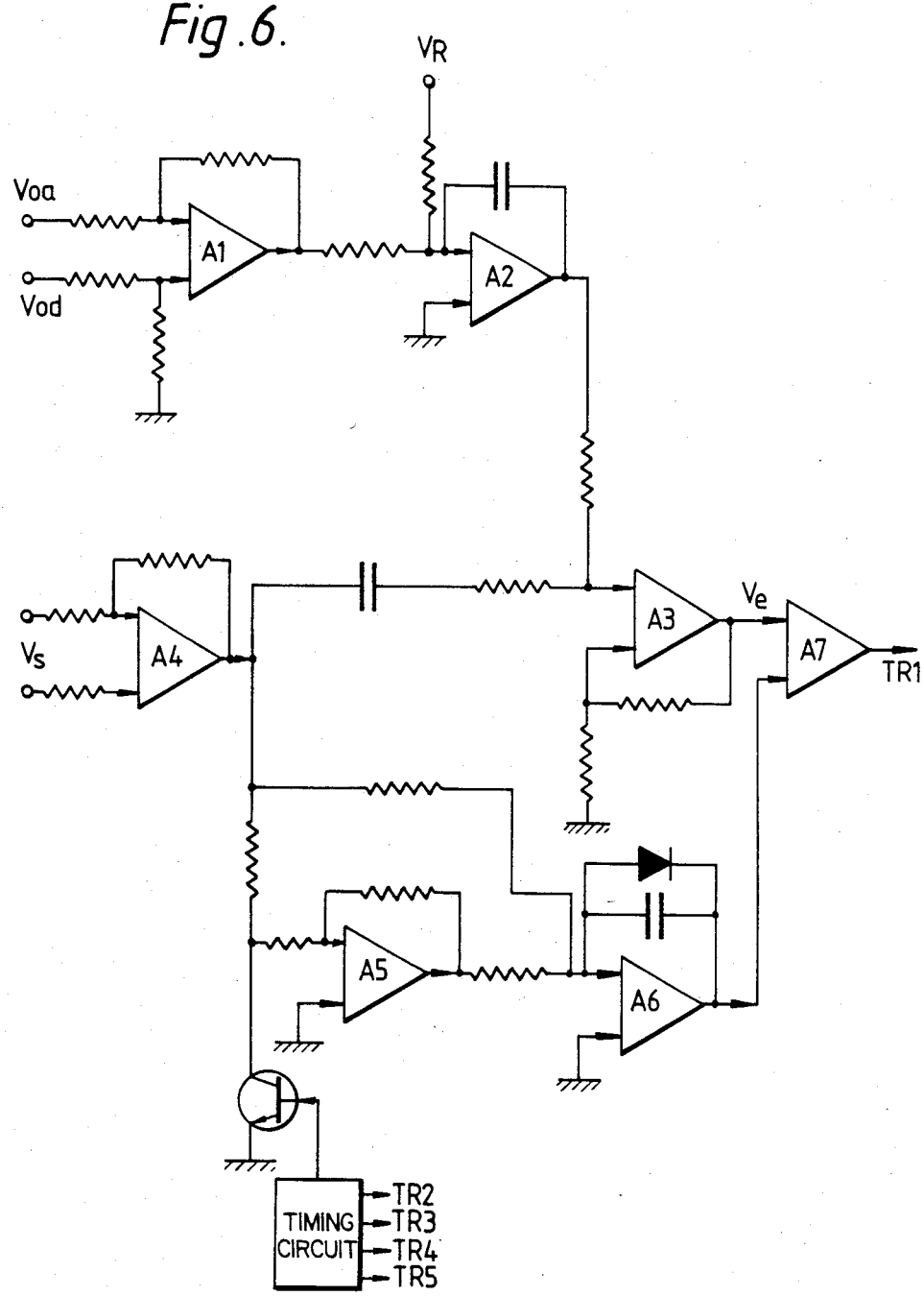
FIG. 6 is a schematic circuit diagram of a control circuit.

As already stated, the switch control waveforms are produced by a control circuit. The switches TR2 to TR5 follow a fixed sequence which does not change with supply or load conditions, but the timing of switch TR1 is dependent upon these conditions. FIG. 6 shows a schematic diagram of a control circuit which will produce the necessary control of switch TR1. The control circuit shown has as its inputs the supply voltage $V_s$ and also voltages representing the ac and dc components of the output voltage $V_o$ supplied to the load. These latter voltages are obtained from the circuit of FIG. 3, the ac component $V_{oa}$ being obtained across a resistance-capacitance voltage divider R1C1, whilst the dc component $V_{od}$ is obtained across a potential divider R2R3.

The voltages $V_{oa}$ and $V_{od}$ are applied to inputs of an amplifier A1 and the output of the amplifier A1 is added to a reference voltage $V_R$. This sum is integrated by integrator A2 and applied to a summing amplifier A3. The supply voltage $V_s$ is applied to an amplifier A4, and a signal proportional to that voltage is also applied to summing amplifier A3 to produce an error signal $V_e$.

The signal proportional to supply voltage $V_s$ is also applied to a ramp generator in the form of an amplifier A5 and a dual-slope integrator A6. A comparator A7 compares the error signal $V_e$ with the output of the ramp generator and produces a signal for operating switch TR1.

The ramp generator is arranged to generate a voltage as shown in FIG. 5 which increase linearly at a rate proportional to the supply voltage $V_s$ for a time $T_2/2$ from to $t_2$, and then decrease linearly at the same rate for a further time $T_2/2$ from $t_2$ to $t_4$. The comparator A7 switches switch TR1 on when the ramp voltage rises to the reference voltage $V_e$, and switches TR1 off again when the ramp voltage falls below $V_e$.

The switching waveforms for the switches TR2 to TR5 are produced by a simple timing circuit TC which produces also a synchronising signal for the ramp generator, to maintain synchronism between all the switches.

FIG. 7 illustrates the effect of variations in the supply voltage $V_s$. The curve (a) in FIG. 7 is the inductor current/time curve and shows in solid line the same curve ABCD as in FIG. 6. Similarly the ramp generator output (b) and switch TR1 control curves (c) are also shown. The time $T_1$ is the time for which switch TR1 is closed during a cycle of operation.

The broken line in FIG. 7 (a) shows the effect on the inductor current of an increase in the supply voltage $V_s$, and curves (d) and (e) illustrate the reason for this. A comparison between curves (b) and (d) shows that an increase in $V_s$ causes an increase in the slope of the sides of the ramp generator output, and also an increase in the error voltage $V_e$ produced by the control circuit of FIG. 5. As a result the switch TR1 control signal is produced for a shorter time $T_1'$ as shown in FIG. 7 (e). Hence the inductor current now follows the curve AB'C'D. However, as already described the quantity of charge transferred to the reservoir capacitor during the cycle remains unchanged.

If the load to be supplied is a pulsed load such as a radar transmitter, then the pulse may be used to synchronise the operation of the switches. Variations in the pulse rate are accomodated by variations in the "dead time" $T_3$ in the operating cycle.

From the above description it will be realised that the invention allows both fixed and variable frequency operation whilst maintaining fixed quantum charge transfer to the lead and fixed steady state current operating conditions. In addition the feedforward from the input supply voltage $V_s$ permits the correction of errors due to supply voltage variations without the need for excessive gain/bandwidth in the control loop.

What I claim is:

1. A direct-current power supply circuit which includes a series-connected switch and an inductor connected together with a flywheel diode across an input voltage supply, a transformer having a primary winding connected to the inductor and the diode by way of a bridge-connected network of switching devices, a reservoir capacitor connected to a secondary winding of the transformer by way of a full-wave rectifier and arranged for connection to a load, and control means comprising first circuit means operable to produce a triangular voltage waveform having positive and negative gradients proportional to the value of the supply voltage, and second circuit means responsive to the alternating-current and direct-current components of the output voltage applied to the load to produce a reference error voltage, the series-connected switch being closed when the triangular voltage exceeds the reference error voltage and being opened when the triangular voltage is below the reference error voltage, the arrangement being such that a voltage of either one or the opposite polarity or a short-circuit may be applied across the primary winding of the transformer and such that each cycle of operation of the switching devices and of the series-connected switch transfers an equal amount of charge to the reservoir capacitor regardless of variations in the input or output voltage.

2. A circuit as claimed in claim 1 in which the switches forming the network of switching devices are operated in a predetermined fixed sequence by the control circuit, the operation of the first circuit means being synchronised with the predetermined fixed sequence.

* * * * *